(12) United States Patent
Katou et al.

(10) Patent No.: US 10,029,649 B2
(45) Date of Patent: Jul. 24, 2018

(54) VEHICLE SYSTEM, ONBOARD APPARATUS, AND PORTABLE DEVICE

(71) Applicant: DENSO CORPORATION, Kariya, Aichi-pref. (JP)

(72) Inventors: Kenji Katou, Kariya (JP); Nobuyoshi Nagai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 116 days.

(21) Appl. No.: 15/034,079

(22) PCT Filed: Oct. 6, 2014

(86) PCT No.: PCT/JP2014/005069
§ 371 (c)(1),
(2) Date: May 3, 2016

(87) PCT Pub. No.: WO2015/064016
PCT Pub. Date: May 7, 2015

(65) Prior Publication Data
US 2016/0280184 A1    Sep. 29, 2016

(30) Foreign Application Priority Data
Nov. 4, 2013   (JP) ................................. 2013-228892

(51) Int. Cl.
*B60R 25/24*    (2013.01)
*B60R 25/00*    (2013.01)
(Continued)

(52) U.S. Cl.
CPC ............. *B60R 25/24* (2013.01); *E05B 49/00* (2013.01); *G07C 9/00309* (2013.01); *G07C 2009/00555* (2013.01)

(58) Field of Classification Search
CPC ........... B60R 25/00; B60R 25/24; G07C 9/00; G07C 9/00309; E05B 49/00
See application file for complete search history.

(56) References Cited

U.S. PATENT DOCUMENTS 5,204,672 A * 4/1993 Brooks ............... B60R 25/1003
340/12.22
6,552,649 B1   4/2003 Okada et al.
(Continued)

FOREIGN PATENT DOCUMENTS

JP   2000073635 A   3/2000
JP   2006342545 A   12/2006
(Continued)

*Primary Examiner* — Yonel Beaulieu
(74) *Attorney, Agent, or Firm* — Harness, Dickey & Pierce, P.L.C.

(57) ABSTRACT

A vehicle system comprises an onboard apparatus that is mounted to a vehicle, and a portable device. The vehicle system controls the vehicle according to a result of collation using wireless communication in which a signal is transmitted and received on electric wave, between the onboard apparatus and the portable device. The onboard apparatus includes a vehicle-side transmission processor that transmits a first signal which specifies signal intensity information and, following transmission of the first signal, transmits a second signal having a signal intensity, the signal intensity information being information on the signal intensity of the second signal. The portable device includes a portable device-side reception antenna that receives a signal transmitted from the vehicle-side transmission antenna, a signal intensity measurement portion, and a reply determiner that determines whether a replay is performed to the onboard apparatus for the collation.

10 Claims, 7 Drawing Sheets

(51) Int. Cl.
*E05B 49/00* (2006.01)
*G07C 9/00* (2006.01)

(56) References Cited

U.S. PATENT DOCUMENTS

| | | | | |
|---|---|---|---|---|
| 8,155,827 | B2* | 4/2012 | Nakajima | B60R 25/24 340/426.16 |
| 9,260,079 | B2* | 2/2016 | Miyazawa | B60R 25/24 |
| 9,424,698 | B2* | 8/2016 | Yasui | G07C 9/00007 |
| 9,478,848 | B2* | 10/2016 | Nagata | H01Q 1/325 |
| 9,758,128 | B2* | 9/2017 | Miyazawa | B60R 25/24 |
| 2004/0164615 | A1* | 8/2004 | Alexandropoulos | B60R 25/24 307/10.1 |
| 2005/0104715 | A1* | 5/2005 | Farrell | B60C 23/0408 340/5.64 |
| 2006/0077037 | A1* | 4/2006 | Luo | B60R 25/24 340/5.72 |
| 2006/0114100 | A1* | 6/2006 | Ghabra | E05B 81/78 340/5.61 |
| 2007/0188301 | A1* | 8/2007 | Nakajima | B60R 25/24 340/5.61 |
| 2008/0088411 | A1* | 4/2008 | Ghabra | B60R 25/24 340/5.64 |
| 2008/0258868 | A1* | 10/2008 | Nakajima | B60R 25/24 340/5.72 |
| 2009/0091423 | A1* | 4/2009 | Nagaoka | B60R 25/24 340/5.72 |
| 2010/0305779 | A1* | 12/2010 | Hassan | G01C 17/38 701/2 |
| 2013/0149973 | A1* | 6/2013 | Murasaki | H04B 1/1027 455/68 |
| 2015/0120085 | A1 | 4/2015 | Sanji et al. | |

FOREIGN PATENT DOCUMENTS

| | | |
|---|---|---|
| JP | 2012067500 A | 4/2012 |
| JP | 2013245468 A | 12/2013 |

* cited by examiner

FIG. 6
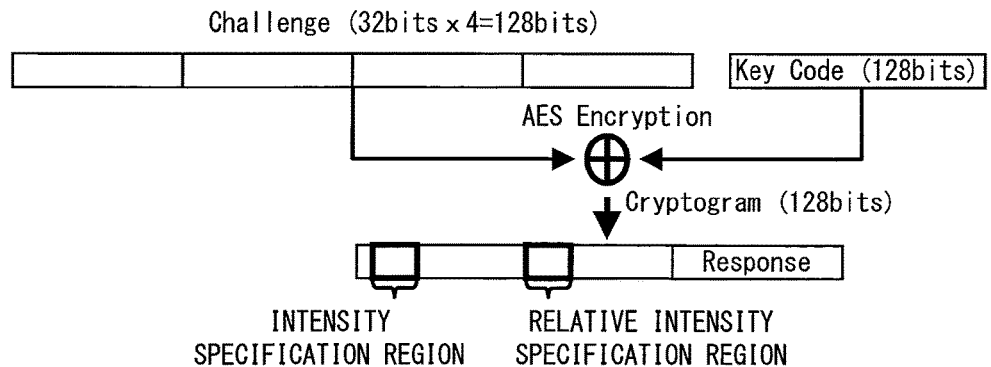
FIG. 7A
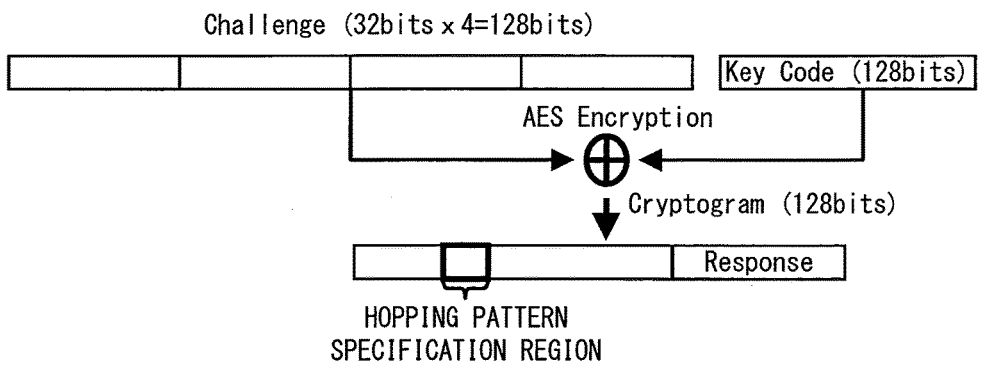
FIG. 7B
```
00 : Ch1
01 : Ch2      Ex.  01   00   10   01   10   00
10 : Ch3           Ch2  Ch1  Ch3  Ch2  Ch3  Ch1
11 : Ch4
```

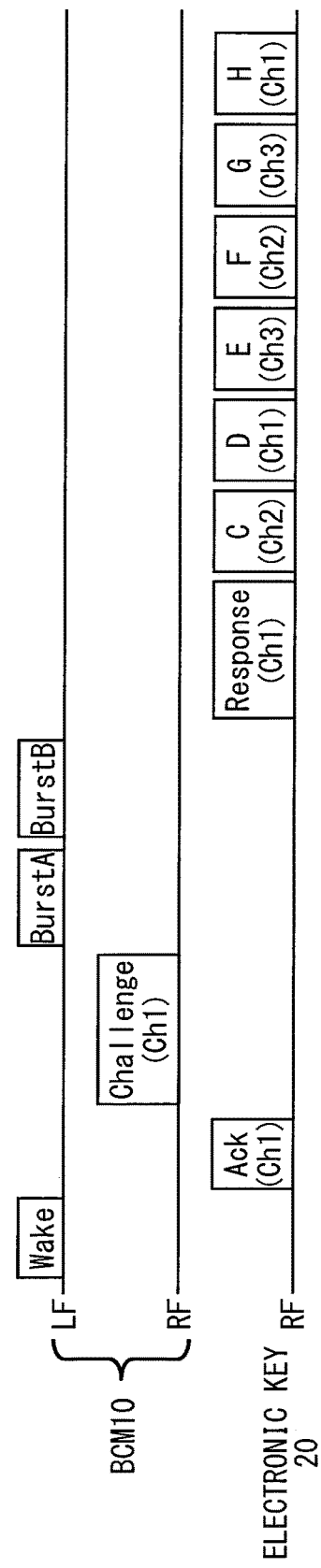

VEHICLE SYSTEM, ONBOARD APPARATUS, AND PORTABLE DEVICE

CROSS-REFERENCE TO RELATED APPLICATIONS

This application is a U.S. National Phase Application under 35 U.S.C. 371 of International Application No. PCT/JP2014/005069 filed on Oct. 6, 2014 and published in Japanese as WO 2015/064016 A1 on May 7, 2015. This application is based on and claims the benefit of priority from Japanese Patent Application No. 2013- 228892 filed on Nov. 4, 2013. The entire disclosures of all of the above applications are incorporated herein by reference.

TECHNICAL FIELD

The present disclosure relates to a vehicle system, and an onboard apparatus and a portable device that are included in the vehicle system implementing authentication by wireless communication between the onboard apparatus mounted to a vehicle and the portable device carried by a user.

BACKGROUND ART

Conventionally, a smart system has been known, which controls a vehicle by using wireless communication between a portable device carried by a user and an onboard apparatus. The smart system performs smart operation such as unlocking of a door or start-up of a vehicle driving apparatus, by the portable device receiving a request signal transmitted from the onboard apparatus and replying an answer signal to the vehicle from the portable device.

For the smart system, there is a concern of a relay attack in which a suspicious person causes a vehicle to perform the smart operation by indirectly implementing communication between the portable device and the onboard apparatus with a relay, and by performing code matching.

In contrast, a technique for a countermeasure to the relay attack is disclosed in Patent literature 1. In the technique disclosed in Patent literature 1, multiple reception antennas of a portable device receive signals from multiple transmission antennas of an onboard apparatus, which are respectively provided to different positions of the vehicle. A relay attack is determined from an intensity ratio of the received signals between respective reception antennas.

In the technique of Patent literature 1, it is necessary for the portable device to receive all of signals from the multiple transmission antennas of the onboard apparatus. Accordingly, the multiple transmission antennas of the onboard apparatus may need to be provided so that most of the transmission ranges of the transmission antennas overlap each other.

The inventors of the present application have found the following regarding a vehicle system and an onboard apparatus and a portable device that are included in the vehicle system implementing authentication by wireless communication.

It may be necessary to make the arrangement different from the arrangement of the transmission antennas in a typical smart system in order to provide the multiple transmission antennas in the vehicle so that most of the transmission ranges of the transmission antennas overlap each other. Since the arrangement needs to satisfy a condition that the transmission antennas are arranged to be acceptable in terms of appearance of the vehicle when changing the arrangement of the transmission antennas, the effort and the cost for satisfying this condition may increase.

In order for most of the transmission ranges of the respective transmission antennas provided to different positions of the vehicle to overlap each other, it may be necessary to significantly increase the antenna output of the transmission antenna, and thus the power consumption of the vehicle may increase.

PRIOR ART LITERATURE

Patent literature

Patent literature 1: JP 2006-342545 A

SUMMARY OF INVENTION

It is an object of the present disclosure to provide a vehicle system, an onboard apparatus, and a portable device, allowing prevention of damage caused by a relay attack while suppressing an arrangement change and power consumption of the vehicle-side transmission antennas as less as possible.

A vehicle system according to an example of the present disclosure comprises an onboard apparatus mounted to a vehicle, and a portable device carried by a user. The vehicle system controls the vehicle according to a result of collation using wireless communication in which a signal is transmitted and received on electric wave, between the onboard apparatus and the portable device. The onboard apparatus includes a vehicle-side transmission processor that transmits a first signal that specifies signal intensity information and, following transmission of the first signal, transmits a second signal having a signal intensity according to the signal intensity information, from a vehicle-side transmission antenna placed to the vehicle, the signal intensity information being information on the signal intensity of the second signal that is transmitted after the transmission of the first signal. The portable device includes a portable device-side reception antenna, a signal intensity measurement portion, and a reply determiner. The portable device-side reception antenna receives a signal transmitted from the vehicle-side transmission antenna. The signal intensity measurement portion measures a signal intensity of the signal received by the portable device-side reception antenna after the first signal. The reply determiner determines whether a replay is performed to the onboard apparatus for the collation, based on the signal intensity information on the signal intensity of the second signal, the signal intensity of the second signal being specified from the first signal received by the portable device-side reception antenna, and the signal intensity that is actually measured by the signal intensity measurement portion.

According to the present disclosure, an onboard apparatus and a portable device which are used in the vehicle system are provided.

According to the vehicle system according to one example of the present disclosure, signal intensity information on the signal intensity of the second signal is specified from a first signal transmitted from the onboard apparatus to the portable device prior to the transmission of the second signal. It is determined whether a reply to the onboard apparatus for verification is performed or not, based on the signal intensity information on the signal intensity of the second signal and the signal intensity that is actually measured by the signal intensity measurement portion, the signal intensity of the second signal being specified from the first signal received from the portable device-side reception antenna.

Thus, during a relay attack, it may be possible that the reply determinator determines not to perform a reply from the portable device, depending on whether the signal intensity determined from the actually measured signal intensity or a value obtained from the signal intensity matches a value for the signal intensity of the second signal obtained from the specified signal intensity information. Therefore, it may be possible to prevent the relay attack.

Further, according to the vehicle system according to one example of the present disclosure, since intensity ratios of respective signals transmitted from different vehicle-side transmission antennas are not required, even when multiple vehicle-side transmission antennas are provided in different positions of the vehicle, it is unnecessary to make most of the transmission ranges of the respective vehicle-side transmission antennas overlap each other. Therefore, it is neither necessary to make the arrangement different from the arrangement of the vehicle-side transmission antennas of a typical smart system, nor necessary to significantly increase the antenna outputs of the vehicle-side transmission antennas.

Therefore, it may be possible to prevent a damage by a relay attack while suppressing an arrangement change and power consumption of the vehicle-side transmission antennas as less as possible.

Further, since the onboard apparatus and the portable device according to one example of the present disclosure are used in the vehicle system described above, it may be possible to prevent the damage caused by a relay attack even while suppressing an arrangement change and power consumption of the vehicle-side transmission antennas.

BRIEF DESCRIPTION OF DRAWINGS

The above and other aspects, features and advantages of the present disclosure will become more apparent from the following detailed description made with reference to the accompanying drawings. In the drawings:

FIG. 6 is a diagram illustrating an intensity specification region and a relative intensity specification region;

FIG. 7A is a diagram illustrating a hopping pattern specification region;

FIG. 7B is a diagram illustrating the hopping pattern specification region; and

FIG. 8 is a diagram illustrating an outline of a transmission timing of a signal transmitted in the electronic key system.

EMBODIMENTS FOR CARRYING OUT INVENTION

Figure 1:
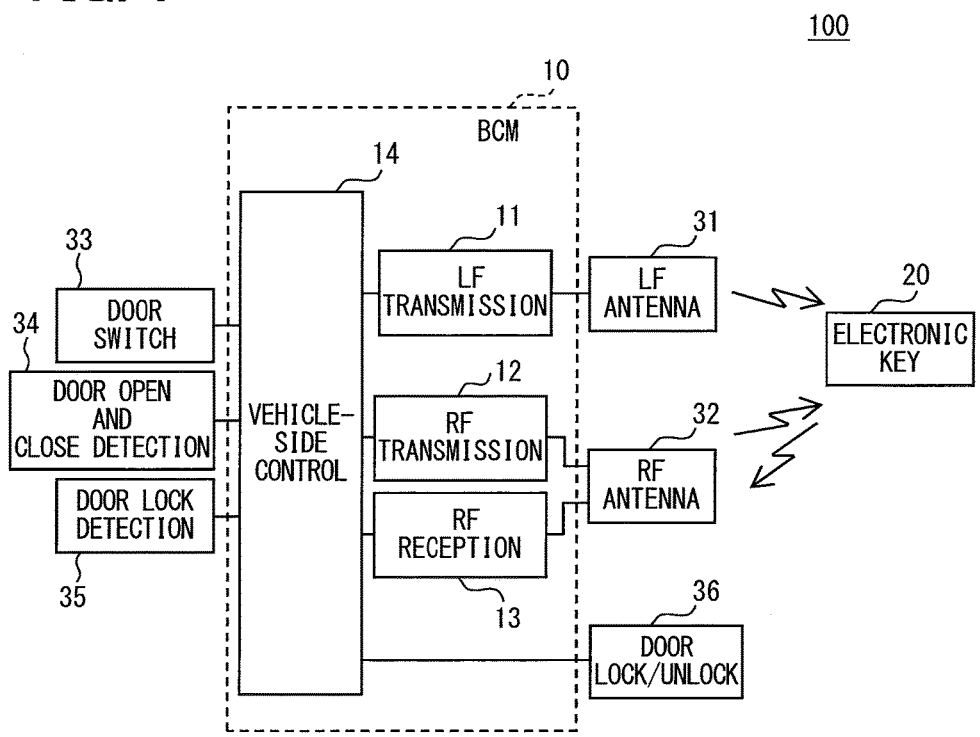
FIG. 1 is a block diagram illustrating an example of a schematic configuration of an electronic key system.

Embodiment of the present disclosure will be described with reference to the drawings. FIG. 1 is a diagram illustrating an example of a schematic configuration of an electronic key system 100. The electronic key system 100 illustrated in FIG. 1 includes a body control module (hereinafter, referred to as a BCM) 10 mounted to a vehicle, and an electronic key 20 carried by a user. The BCM 10 corresponds to an onboard apparatus of the present disclosure. The electronic key 20 corresponds to a portable device of the present disclosure. The electronic key system 100 corresponds to a vehicle system of the present disclosure. The electronic key system 100 has a smart function similar to a typical smart system.

The smart function represents a function of performing code collation between the BCM 10 and the electronic key 20 by wireless communication, and performing a locking control and an unlocking control of a door or a start-up permission of a vehicle when verification is established.

As illustrated in FIG. 1, the BCM 10 includes an LF transmitter 11, an RF transmitter 12, an RF receptor 13, and a vehicle-side controller 14.

The LF transmitter 11 is connected to an LF antenna 31 that is a transmission antenna for transmitting a signal on electric wave of an LF band. For convenience, only a single LF antenna 31 is illustrated in FIG. 1, but a configuration may be possible in which multiple LF antennas 31 are arranged near a side door, inside a trunk, or the like. The LF antenna 31 corresponds to a vehicle-side transmission antenna of the present disclosure.

The LF transmitter 11 transmits a signal that is input from the vehicle-side controller 14 on electric wave of the LF band, from the LF antenna 31. As an example, it may be configured to transmit the signal on the electric wave of a 125 kHz band.

An RF antenna 32 that is a transmission and reception antenna for transmitting and receiving signals on electric wave of a UHF band is connected to the RF transmitter 12 and the RF receptor 13. The RF transmitter 12 transmits a signal that is input from the vehicle-side controller 14 on electric wave of the UHF band from the RF antenna 32. As an example, it may be configured to transmit a signal on electric wave of a 315 MHz band.

A reception frequency of a signal is determined by the vehicle-side controller 14, and the RF receptor 13 performs a process such as amplification and demodulation on the signal received by the RF antenna 32. The RF antenna 32 corresponds to a vehicle-side reception antenna of the present disclosure. The RF receptor 13 corresponds to a vehicle-side receptor of the present disclosure.

The vehicle-side controller 14 mainly includes a microcomputer including a CPU, a ROM, a RAM, a backup RAM, an I/O, or the like (not shown). The vehicle-side controller 14 performs various processes by executing various control programs stored in the ROM. The LF transmitter 11, the RF transmitter 12, the RF receptor 13, a door switch 33, a door open-and-close detector 34, a door locking detector 35, and a door lock-and-unlock portion 36 are connected to the vehicle-side controller 14.

Figure 2:
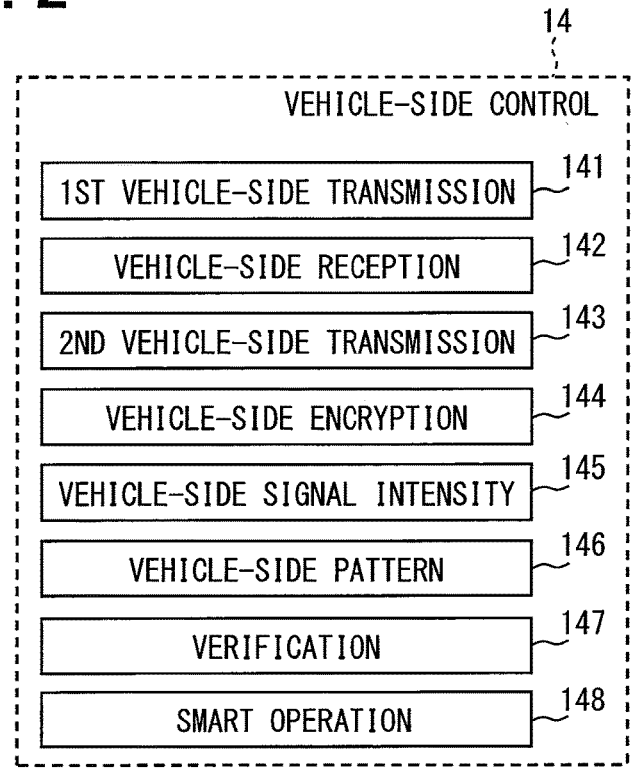
FIG. 2 is a block diagram illustrating an example of a schematic configuration of a vehicle-side controller.

As illustrated in FIG. 2, the vehicle-side controller 14 includes a first vehicle-side transmission processor 141, a vehicle-side reception processor 142, a second vehicle-side transmission processor 143, a vehicle-side encryption processor 144, a vehicle-side signal intensity specification portion 145, a vehicle-side pattern specification portion 146, a verification processor 147, and a smart operation instructor 148, as functional blocks.

The door switch 33 is a touch switch that is provided near a door knob for opening and closing the vehicle door, or a touch switch that is provided near a door knob of a trunk of the vehicle. A signal corresponding to the operation on the door switch 33 by the user is output to the vehicle-side controller 14.

The door open-and-close detector 34 is a switch for detecting the open or closed state of the vehicle door or the trunk. A signal indicating the open or closed state of the vehicle door or the trunk is output from the door open-and-close detector 34 to the vehicle-side controller 14.

The door locking detector 35 is a switch for detecting the locked state of the vehicle door or the trunk. A signal indicating the locked state of the vehicle door or the trunk is output from the door locking detector 35 to the vehicle-side controller 14.

The door lock-and-unlock portion 36 includes an actuator for locking and unlocking the vehicle door or the trunk. The door lock-and-unlock portion 36 locks and unlocks the vehicle door or the trunk by driving each actuator.

The electronic key 20 will be described with reference to FIG. 3. The electronic key 20 is carried by the user. The phrase of "being carried by the user" is not limited to a case where the user actually carries the electronic key 20, and includes a case where the user is able to carry, but actually is not carrying the electronic key 20.

Figure 3:
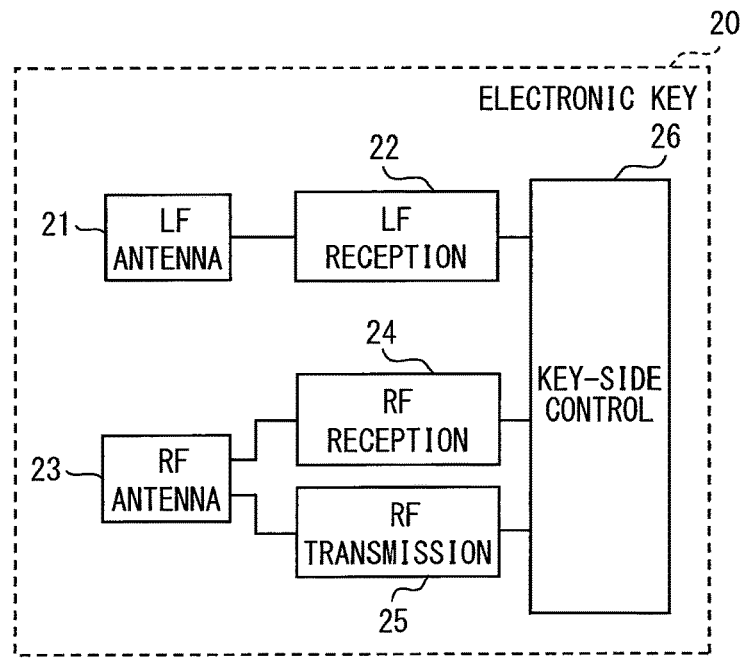
FIG. 3 is a block diagram illustrating an example of a schematic configuration of an electronic key.

As illustrated in FIG. 3, the electronic key 20 includes an LF antenna 21, an LF receptor 22, an RF antenna 23, an RF receptor 24, an RF transmitter 25, and a key-side controller 26. The electronic key 20 has a configuration of a general electronic key, including a battery, a switch, and an emergency key in addition to, but for convenience, a description regarding the configuration unrequired for the description of the present disclosure will be omitted.

The LF antenna 21 that is a reception antenna for receiving a signal transmitted on electric wave of the LF band is connected to the LF receptor 22. The LF antenna 21 may be, for example, a three axes antenna with two axes in a horizontal direction and an axis in a vertical direction. The LF antenna 21 corresponds to a portable device-side reception antenna of the present disclosure. The LF receptor 22 performs a process such as amplification and demodulation on a signal received by the LF antenna 21.

The RF antenna 23 that is a transmission and reception antenna for transmitting and receiving a signal of electric wave of the UHF band is connected to the RF receptor 24 and the RF transmitter 25. The RF antenna 23 also corresponds to a portable device-side transmission antenna of the present disclosure. The RF receptor 24 performs a process such as amplification and demodulation on a signal received by the RF antenna 23. The RF transmitter 25 transmits a signal that is input from the key-side controller 26 on electric wave of the UHF band, from the RF antenna 23.

The key-side controller 26 mainly includes a microcomputer including a CPU, a ROM, a RAM, a backup RAM, an I/O, or the like (not shown). The key-side controller 26 performs various processes by executing various control programs stored in the ROM. The LF receptor 22, the RF receptor 24, and the RF transmitter 25 are connected to the key-side controller 26.

Figure 4:
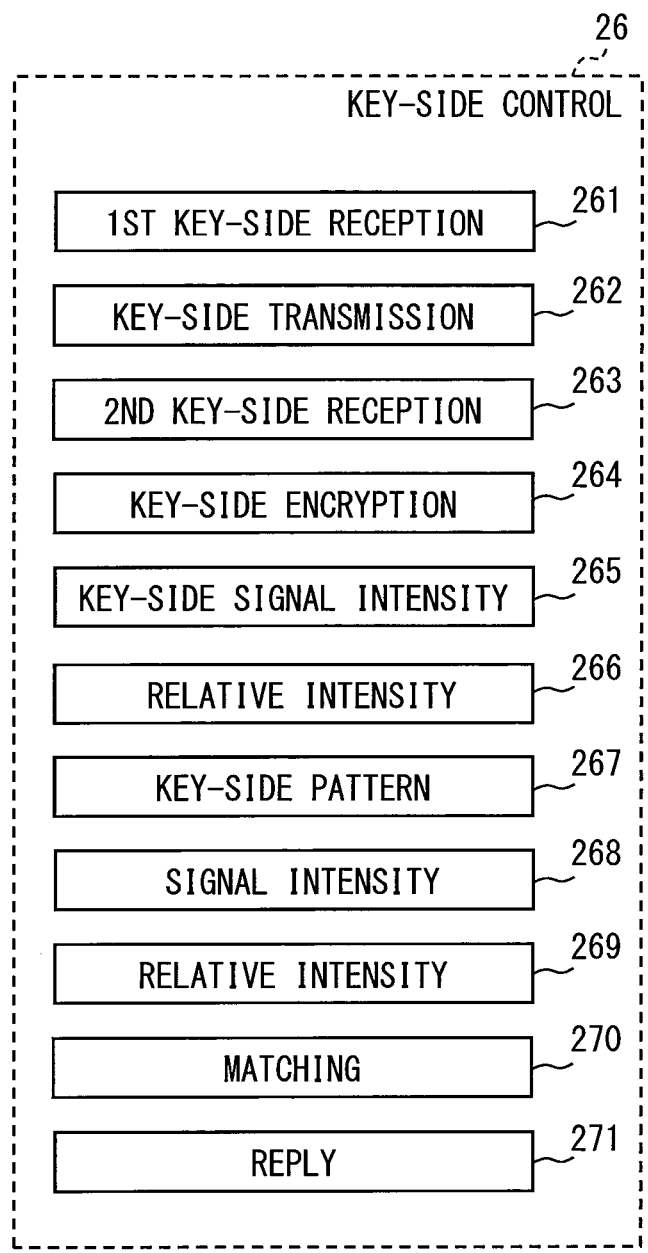
FIG. 4 is a block diagram illustrating an example of a schematic configuration of a key-side controller.

As illustrated in FIG. 4, the key-side controller 26 includes a first key-side reception processor 261, a key-side transmission processor 262, a second key-side reception processor 263, a key-side encryption processor 264, a key-side signal intensity specification portion 265, a relative intensity specification portion 266, a key-side pattern specification portion 267, a signal intensity measurement portion 268, a relative intensity calculator 269, a match determiner 270, and a reply determiner 271, as functional blocks.

Figure 5A:
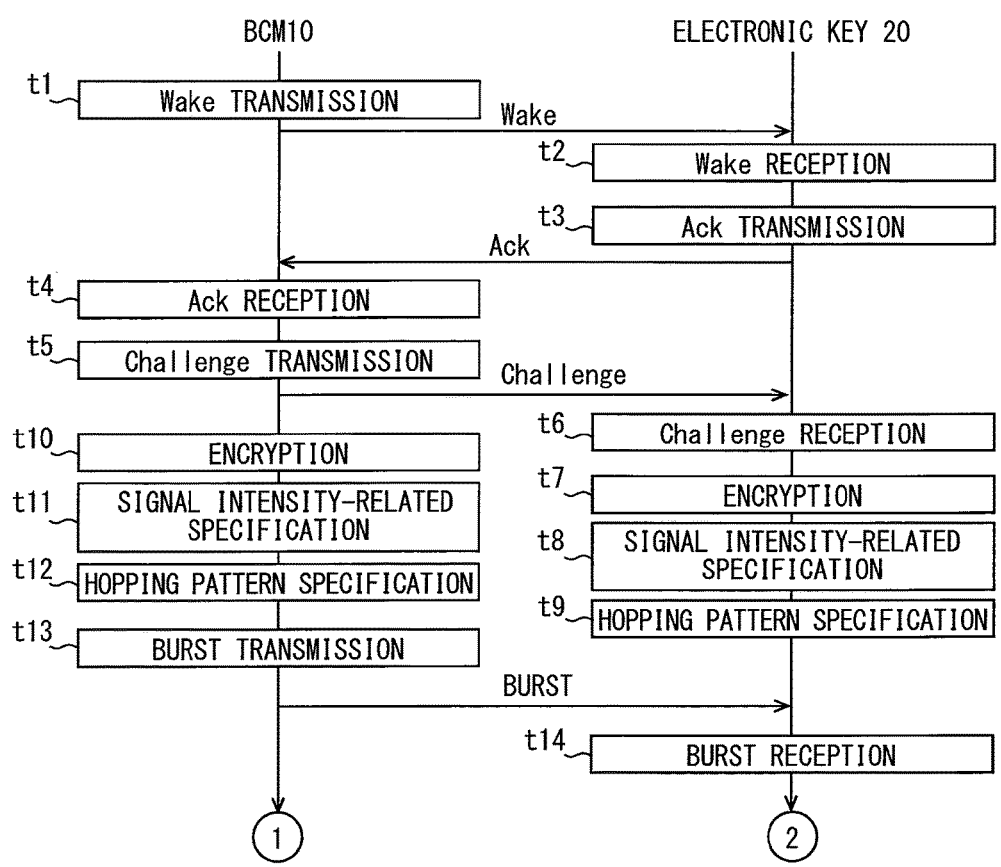
FIG. 5A is a sequence diagram illustrating an example of a flow of a process relating to a smart function of the electronic key system.
Figure 5B:
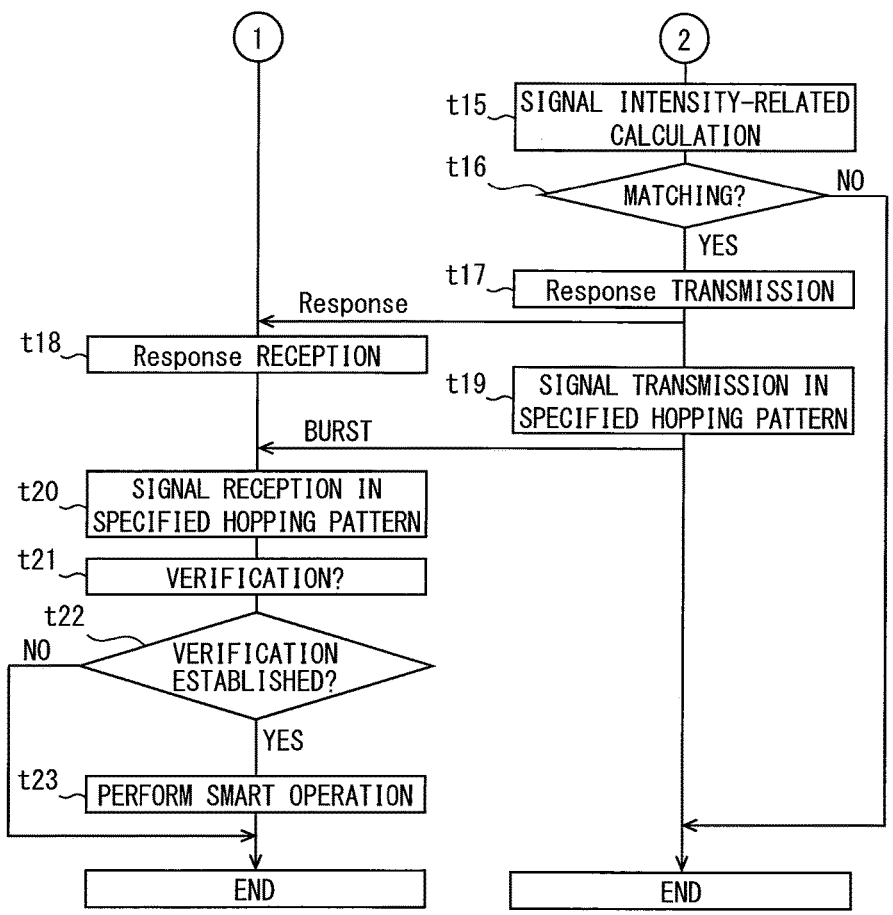
FIG. 5B is a sequence diagram illustrating the example of the flow of the process relating to the smart function of the electronic key system.

An example of a processing flow associated with the smart function in the electronic key system 100 will be described with reference to sequence diagrams of FIG. 5A and FIG. 5B. As an example, the process of FIG. 5A and FIG. 5B may be configured to be started when the user operates the door switch 33 near the vehicle door and a signal in response to the user's operation is input to the BCM 10 from the door switch 33.

In the present embodiment, the following description will be made assuming that Burst signals are transmitted twice, following the transmission of a Challenge signal from the vehicle. In addition, a first Burst signal transmitted from the vehicle is defined as Burst A, and a second Burst signal is defined as Burst B.

The first vehicle-side transmission processor 141 of the BCM 10 transmits a Wake signal on electric wave of the LF band, through the LF transmitter 11 and the LF antenna 31 in t1 (referred to as a Wake transmission), and the process shifts to t2. The Wake signal is a signal for moving the electronic key 20 that is in the sleep state to the wake-up state.

At t2, the first key-side reception processor 261 of the electronic key 20 receives the Wake signal through the LF antenna 21 and the LF receptor 22, and the process shifts to t3. The key-side transmission processor 262 of the electronic key 20 transmits an Acknowledgment (Ack) notifying that the electronic key 20 has moved to the wake-up state, on electric wave of the UHF band (referred to as a Ack transmission), through the RF transmitter 25 and the RF antenna 23, in t3, and the process shifts to t4.

The vehicle-side reception processor 142 of the BCM 10 receives the Ack, through the RF antenna 32 and the RF receptor 13, in t4. The process shifts to t5. The second vehicle-side transmission processor 143 of the BCM 10 transmits a Challenge signal on electric wave of the UHF band (referred to as a Challenge transmission) through the RF transmitter 12 and the RF antenna 32 in t5, and the process shifts to t6. The Challenge signal is a signal of a code including a random number.

The second key-side reception processor 263 of the electronic key 20 receives the Challenge signal through the RF antenna 23 and the RF receptor 24 in t6, and the process shifts to t7. The key-side encryption processor 264 of the electronic key 20 performs encryption in t7 using a secret key and an encryption algorithm that are common to the BCM 10 and electronic key 20, based on the Challenge signal received in t6, and the process shifts to t8. The key-side encryption processor 264 corresponds to the portable device-side encryption processor of the present disclosure. The encryption algorithm may be configured to use, for example, an advanced encryption standard (AES) method.

In the present embodiment, the following description will be made, as an example, regarding a case of generating an encryption code of 128 bits using the AES method, from data of 128 bits which is four times the code of the Challenge signal of 32 bits and the secret key of 128 bits (in other words, Key Code). The encryption code that is generated using the AES method is represented by two values of 0 and 1.

Incidentally, in the present embodiment, the case of using the AES method as an encryption algorithm is given as an example. As long as an encryption code is represented by 0 and 1 in an encryption algorithm, the present embodiment may be configured to use other encryption algorithms.

In t8, the key-side signal intensity specification portion 265 specifies an electric field intensity (in other words, a signal intensity) of the Burst signal transmitted from the vehicle, following the Challenge signal, from the sequence of a signal intensity specification-predetermined region (hereinafter, referred to as an intensity specification region) of the encryption code that is encrypted in t7, as illustrated in FIG. 6. It is supposed that the intensity specification region is defined in advance as the upper second bit to the fifth bit of the encryption code by the key-side controller 26. As described above, among the Burst signals that have been transmitted twice, the first transmitted signal is the Burst A, and the second transmitted signal is the Burst B. The key-side signal intensity specification portion 265 specifies, for example, the electric field intensity of the Burst A.

For example, the electric field intensity of the Burst A is set to X dBm when the sequence of the intensity specification region of the encryption code is "0100", and the electric field intensity of the Burst A is set to Y dBm when the sequence of the intensity specification region of the encryption code is "0001". That is, according to the sequence of the intensity specification region, the electric field intensity of the Burst A is specified. As an example, the key-side signal intensity specification portion 265 may specify the electric field intensity of the Burst A, by referring to a correspondence, which is associated in advance, between the code sequence and the electric field intensity of the Burst A.

In t8, the relative intensity specification portion 266 specifies an electric field intensity difference between the Burst signals transmitted multiple times from the vehicle, following the Challenge signal, from the sequence of a relative intensity specification-predetermined region (hereinafter, referred to as a relative intensity specification region) of the encryption code that is encrypted in t7, as illustrated in FIG. 6.

It is supposed that the relative intensity specification region is defined in advance as the upper 20th bit to the 23rd bit of the encryption code by the key-side controller 26. The relative intensity specification region corresponds to a first predetermined region of the present disclosure.

The present embodiment uses the electric field intensity difference, as an example. It is not necessarily limited thereto. For example, the present embodiment may use an electric field intensity ratio.

The relative intensity specification portion 266 specifies, for example, the electric field intensity difference between the Burst A and the Burst B. For example, the electric field intensity difference between the Burst A and the Burst B is specified depending on the sequence of the relative intensity specification region in such a manner that when the sequence of the intensity specification region of the encryption code is "0100", the electric field intensity difference between the Burst A and the Burst B is set to Z dBm, and in the case of "0001", the electric field intensity difference between the Burst A and the Burst B is set to W dBm. As an example, the relative intensity specification portion 266 may be configured to specify the electric field intensity difference between the Burst A and the Burst B, by referring to a correspondence, which is associated in advance, between the code sequence and the electric field intensity.

The electric field intensity of the Burst signal and the electric field intensity difference between the Burst signals transmitted multiple times correspond to signal intensity information of the present disclosure. Since the electric field intensity of the Burst signal and the electric field intensity difference between the Burst signals transmitted multiple times can be specified from the sequence of the predetermined region of the encryption code obtained by encrypting the code of the Challenge signal, the Challenge signal corresponds to a first signal of the present disclosure, and the second vehicle-side transmission processor 143 corresponds to the vehicle-side transmission processor of the present disclosure. The Burst signal corresponds to a second signal of the present disclosure.

The present embodiment exemplifies the configuration in which the relative intensity specification portion 266 specifies the electric field intensity difference between the Burst A and the Burst B depending on the sequence of the relative intensity specification region, but is not necessarily limited thereto. For example, the present embodiment may be configured such that the key-side signal intensity specification portion 265 specifies the electric field intensities of not only the Burst A but also the Burst B, and the relative intensity specification portion 266 specifies a difference between these specified electric field intensities as the electric field intensity difference between the Burst A and the Burst B. In this case, it may be configured such that the intensity specification regions for not only the Burst A but also the Burst B are defined in the electronic key system 100 and the key-side signal intensity specification portion 265 specifies the electric field intensity of the Burst B depending on the sequence of the intensity specification region for the Burst B.

In t9, the key-side pattern specification portion 267 specifies a frequency hopping pattern, from the sequence of a frequency hopping pattern specification-predetermined region (hereinafter, referred to as a hopping pattern specification region) of the encryption code that is encrypted in t7, as illustrated in FIG. 7A and FIG. 7B. The frequency hopping pattern corresponds to frequency hopping pattern information of the present disclosure. The key-side pattern specification portion 267 corresponds to the portable device-side pattern specification portion of the present disclosure. The frequency hopping pattern represents a switching pattern of a frequency in a frequency hopping scheme. The frequency hopping scheme is a scheme of changing a frequency at which a signal is transmitted at a very short time interval such as 100 msec.

It is supposed that the hopping pattern specification region is defined in advance as the upper 10th bit to the 22nd bit of the encryption code by the key-side controller 26. The hopping pattern specification region corresponds to the second predetermined region of the present disclosure. Further, it is supposed that a correspondence between a sequence and a frequency type is defined in advance by the key-side controller 26 (see FIG. 7B) in such a manner that, for example, a sequence "00" is a frequency Ch1, a sequence "01" is a frequency Ch2, a sequence "10" is a frequency Ch3, and a sequence "11" is a frequency Ch4.

For example, when the sequence of the hopping pattern specification region of the encryption code is "010010011000", the key-side pattern specification portion 267 specifies the transmission frequency hopping pattern as the Ch2, the Ch1, the Ch3, the Ch2, the Ch3, and the Ch1. The type of the frequency to be switched is not limited to the four types described above, and multiple other types may be used by changing the correspondence between the sequence and the frequency type.

When a Response signal in response to the Challenge signal is transmitted from the electronic key 20, the key-side pattern specification portion 267 specifies the transmission frequency hopping pattern of the Burst signals transmitted multiple times following the Response signal. It is supposed that the time interval from the transmission of the Response signal to the transmission of the Burst signal and the time interval of switching of frequency are defined in advance by the key-side controller 26.

The process of t10 to t13 performed by the BCM 10 in parallel with the process of t6 to t9 performed by the electronic key 20 will be described.

In t10, the vehicle-side encryption processor 144 of the BCM 10 performs encryption using a secret key and an encryption algorithm that are common to the BCM 10 and electronic key 20, based on the Challenge signal transmitted in t5, and the process shifts to t11. The vehicle-side encryption processor 144 corresponds to the vehicle-side encryption processor of the present disclosure.

In t11, a signal intensity specification related process is performed. In the signal intensity specification related process, the vehicle-side signal intensity specification portion 145 specifies an electric field intensity of the Burst A transmitted from the vehicle, following the Challenge signal, from the sequence of an intensity specification region of the encryption code that is encrypted in t10. The electric field intensity of the Burst A transmitted from the vehicle corresponds to the electric field intensity at the time of reception by the electronic key 20. The intensity specification region described is the same region as the intensity specification region of the encryption code that is encrypted in t7. In other words, the same intensity specification region is defined in advance by the key-side controller 26 and the vehicle-side controller 14.

The vehicle-side signal intensity specification portion 145 may be configured to specify the electric field intensity of the Burst A, similar to the key-side signal intensity specification portion 265 in t8. Since the encryption code encrypted in t10 and the encryption code encrypted in t7 are encryption codes that are generated by using the code of the identical Challenge signal, the secret key, and the encryption algorithm, it is assumed that the encryption codes are the same. Therefore, the electric field intensity of the Burst A that is specified by the vehicle-side signal intensity specification portion 145 and the electric field intensity of the Burst A that is specified by the key-side signal intensity specification portion 265 are the identical value.

In the signal intensity specification related process, the vehicle-side signal intensity specification portion 145 specifies an electric field intensity of a Burst B transmitted from the vehicle, following the Challenge signal, in other words, the electric field intensity at the time of reception by the electronic key 20, from the sequence of a relative intensity specification region of the encryption code that is encrypted in t10. The relative intensity specification region described is the identical region as the relative intensity specification region of the encryption code that is encrypted in t7. In other words, the same relative intensity specification region is also defined in advance by the key-side controller 26 and the vehicle-side controller 14.

The vehicle-side signal intensity specification portion 145 may be configured to specify the electric field intensity difference between the Burst A and the Burst B, and to specify the electric field intensity of the Burst B from the electric field intensity difference and the electric field intensity of the Burst A that is specified by the vehicle-side signal intensity specification portion 145, similar to the relative intensity specification portion 266 in t8.

In t12, the vehicle-side pattern specification portion 146 may be configured to specify a frequency hopping pattern, from the sequence of a hopping pattern specification region of the encryption code encrypted in t10, similar to the key-side pattern specification portion 267 in t9. The vehicle-side pattern specification portion 146 corresponds to the vehicle-side pattern specification portion of the present disclosure. The hopping pattern specification region is the identical region as the hopping pattern specification region of the encryption code that is encrypted in t7. In other words, the same hopping pattern specification region is defined in advance by the key-side controller 26 and the vehicle-side controller 14.

The frequency hopping pattern that is specified by the vehicle-side pattern specification portion 146 is the same as the frequency hopping pattern that is specified by the key-side pattern specification portion 267, and corresponds to the reception frequency hopping pattern.

In t13, the first vehicle-side transmission processor 141 transmits the Burst signals in the order of the Burst A and the Burst B, on the electric waves of the LF band, through the LF transmitter 11 and the LF antenna 31, so that the Burst signals have the electric field intensity specified by the vehicle-side signal intensity specification portion 145, and the process shifts to t14. The first vehicle-side transmission processor 141 also corresponds to the vehicle-side transmission processor of the present disclosure.

As an example, it is supposed that the communicable distance in wireless communication using the electric waves of the LF band is equal to a distance in which wireless communication is performed using the electric waves of the LF band between the vehicle and the electronic key 20. In this case, the electric field intensity may become the electric field intensity specified by the vehicle-side signal intensity specification portion 145 by transmitting the Burst signal with a value obtained by adding the attenuation amount in the communicable distance to the electric field intensity specified by the vehicle-side signal intensity specification portion 145 as a transmission output.

Incidentally, as long as the intensity specification region is the same in the key-side controller 26 and the vehicle-side controller 14, a total number of bits of the intensity specification region may be set arbitrarily. Therefore, when it is desired to increase the variation of the value of the electric field intensity of the Burst signal, the number of bits of the intensity specification region may be increased.

The first key-side reception processor 261 receives the Burst signal through the LF antenna 21 and the LF receptor 22 in t14, and the process shifts to t15. In the example of the present embodiment, the Burst signals are received in the order of the Burst A and the Burst B.

A signal intensity-related calculation process is performed in t15, and the process shifts to t16. In the signal intensity-related calculation process, the signal intensity measurement portion 268 of the electronic key 20 measures the electric field intensities (in other words, RSSI) of the Burst A and the Burst B received in t14. The electric field intensity may be measured by a known RSSI circuit.

In the signal intensity-related calculation process, the relative intensity calculator 269 calculates the electric field intensity difference between the Burst A and the Burst B, by calculating a difference between the electric field intensity of the Burst A and the electric field intensity of the Burst B, which are measured by the signal intensity measurement portion 268.

In t16, the match determiner 270 determines whether the electric field intensity difference between the Burst A and the Burst B that is calculated by the relative intensity calculator 269 in t15 and the electric field intensity difference between the Burst A and the Burst B that is specified by the relative intensity specification portion 266 in t8 match or not each other.

As an example, it may be configured to determine that the electric field intensities match each other when the deviation of the value of the electric field intensity difference is within a predetermined value. The predetermined value described herein is equal to a value of an amount of an error, and is equal to a value that can be arbitrarily set. When it is determined that the electric field intensities match each other (YES in t16), it is determined that the reply determiner 271 performs the reply for the Response, and the process shifts to t17. In contrast, when it is determined that the electric field intensities do not match each other (NO in t16), it is determined that the reply determiner 271 does not perform the reply for the Response, and the process terminates.

The present embodiment exemplifies the configuration of determining whether or not the electric field intensity differences between the Burst A and the Burst B match each other. It is not necessarily limited to this embodiment. For example, the present embodiment may be configured to determine whether or not the electric field intensities of the Burst A match each other. It may be configured to determine whether or not the electric field intensities match each other, without determining whether or not the electric field intensity differences match each other. In this case, the configuration used in the setting and the calculation of the electric field intensity difference may be omitted.

In t17, the encryption code that is encrypted based on the Challenge signal by the key-side encryption processor 264 in t7 is assumed as the Response signal. The key-side transmission processor 262 transmits the Response signal on electric wave of the UHF band through the RF transmitter 25 and the RF antenna 23 (corresponding to a Response transmission), and the process shifts to t18. In t18, the vehicle-side reception processor 142 of the BCM 10 receives the Response signal through the RF antenna 32 and the RF receptor 13, and the process shifts to t19.

In t19, the key-side transmission processor 262 transmits a Burst signal multiple times through the RF transmitter 25 and the RF antenna 23, while switching the transmission frequency according to the transmission frequency hopping pattern specified by the key-side pattern specification portion 267 in t9. Then, the process shifts to t20. In addition, the Burst signal transmitted by the key-side transmission processor 262 corresponds to a third signal of the present disclosure. The key-side transmission processor 262 corresponds to the portable device-side transmission processor of the present disclosure.

In t20, the vehicle-side reception processor 142 receives the Burst signals multiple times through the RF antenna 32 and the RF receptor 13, while switching the reception frequency of the RF receptor 13, according to the reception frequency hopping pattern that is specified by the vehicle-side pattern specification portion 146 in t12. Then, the process shifts to t21. The vehicle-side reception processor 142 corresponds to the frequency switch of the present disclosure.

It is supposed that values as the time interval from the reception of the Response signal to the reception of the Burst signal and the time interval of switching of a frequency are defined in advance by the vehicle-side controller 14, which are equal to values similar to the time interval from the transmission of the Response signal to the transmission of the Burst signal and the time interval of switching of a frequency in the key-side controller 26. When the reception frequency of the RF receptor 13 is switched according to the reception frequency hopping pattern that is specified by the vehicle-side pattern specification portion 146, the Burst signal can be received multiple times from the electronic key 20.

In t21, the verification processor 147 of the BCM 10 performs the collation process, and the process shifts to t22.

In the collation process, it is determined whether or not the encryption code encrypted based on the Challenge signal by the vehicle-side encryption processor 144 in t10 and the encryption code received as the Response signal in t18 match each other. Further, in t20, it is determined whether or not the vehicle-side reception processor 142 has received the Burst signal multiple times.

In the collation process, when it is determined that the encryption codes match each other and the Burst signals have received multiple times, it is assumed that collation is established. In contrast, it is assumed that the collation is not established, when any one of the conditions is not satisfied.

When the collation is established in t22 (YES in t22), advancement is made to step t23. In contrast, when the collation is not established (NO in t22), the process terminates.

When the smart operation instructor 148 performs the smart operation in t23, the flow terminates. As an example, the door lock-and-unlock portion 36 is instructed to unlock the door within a predetermined time after the vehicle-side controller 14 receives a signal in response to an operation for the door switch 33. The door lock-and-unlock portion 36 drives an actuator performing the locking of the door of the vehicle in response to the instruction of unlocking of the door, and performs the unlocking of the door of the vehicle. It may be configured to perform start-up permission of the engine of the vehicle or the like, in addition to the unlocking of the door of the vehicle.

An overview of a transmission timing of a signal that is transmitted in the electronic key system 100 will be described using FIG. 8. In the example of FIG. 8, it is supposed that the transmission frequency hopping pattern of the Burst signals C, D, E, F, G, and H that are transmitted from the electronic key 20 is the Ch2, the Ch1, the Ch3, the Ch2, the Ch3, and the Ch1. Here, the wireless communication on electric wave of the LF band is referred to as LF communication, and the wireless communication on electric wave of the UHF band is referred to as RF communication.

As illustrated in FIG. 8, first, when the Wake signal is transmitted from the BCM 10 to the electronic key 20 in the LF communication, the Ack is transmitted from the electronic key 20 to the BCM 10 in the RF communication. Incidentally, it may be configured that the Ack is not transmitted from the electronic key 20.

After the Ack is transmitted from the electronic key 20 to the BCM 10, the Challenge signal is transmitted from the BCM 10 to the electronic key 20 in RF communication. After the Challenge signal is transmitted from the BCM 10 to the electronic key 20, the Burst signals are transmitted to the electronic key 20 in the LF communication in the order of the Burst A and the Burst B so that the Burst A and the Burst B have the electric field intensity and the electric field intensity difference which are specified based on the Challenge signal by the BCM 10.

The electronic key 20 that has received the Burst A and the Burst B measures the electric field intensities of the Burst A and the Burst B, and calculates the electric field intensity difference between the Burst A and the Burst B from the measurement result. The electronic key 20 determines whether or not the electric field intensity difference between the Burst A and the Burst B calculated from the measurement result and the electric field intensity difference between the Burst A and the Burst B that is specified based on the Challenge signal match each other. When it is determined that the calculated electric field intensity difference and the specified electric field intensity difference match each other, the Response signal is transmitted to the BCM 10 from the electronic key 20 in the RF communication.

Following the transmission of the Response signal, the electronic key 20 sequentially transmits the Burst signals to the BCM 10, in the RF communication, according to the transmission frequency hopping pattern specified based on the Challenge signal (referring to C to H in FIG. 8). In addition, since the reception frequency is switched according to the reception frequency hopping pattern specified based on the Challenge signal, the BCM 10 receives the Burst signals that are sequentially transmitted.

According to the configuration of the present embodiment, when the BCM 10 transmits the Challenge signal to the electronic key 20, it may be possible for both of the BCM 10 and the electronic key 20 to specify the electric field intensity or the electric field intensity difference of the Burst signals transmitted from the BCM 10 to the electronic key 20, based on the Challenge signal. It may be possible to determine the presence or absence of the relay attack, depending on whether the electric field intensity of the Burst signal that the electronic key 20 has actually received from the BCM 10 and the electric field intensity difference match the specified electric field intensity and the specified electric field intensity difference.

When the relay attack is made, a signal is transmitted through a relay. Thus, the electric field intensity or the electric field intensity difference of the Burst signals that the electronic key 20 receives from the BCM 10 are the different values, as compared to a case without passing through the relay.

According to the configuration of the present embodiment, when the electric field intensity or the electric field intensity difference of the Burst signal that the electronic key 20 has actually received from the BCM 10 do not match those specified based on the Challenge signal, the electronic key 20 does not transmit the Response signal. Thus, when the relay attack is performed, the Response signal is not replied from the electronic key 20, and it may be possible to prevent the vehicle from being illegally used by the relay attack.

According to the configuration of the present embodiment, by using the electric field intensity difference, it may be possible to suppress the influence of the deviation between the actual measurement value due to the influence of the attenuation and the value specified based on the Challenge signal, and it may be possible to further increase the accuracy of the determination by the match determiner 270.

According to the configuration of the present embodiment, it may be possible for the BCM 10 and the electronic key 20 respectively to specify the frequency hopping pattern of the Burst signal transmitted from the electronic key 20 to the BCM 10, based on the Challenge signal. Performing transmission and reception according to the specified frequency hopping pattern, it may be possible to prevent the transmission and reception of the Burst signal through the relay. Therefore, also in this respect, it may be possible to prevent the vehicle from being illegally used by the relay attack.

The present embodiment exemplifies the configuration of transmitting the Challenge signal from the vehicle on electric wave of the UHF band. However, the embodiment is not necessarily limited thereto. For example, it may be configured to transmit the Challenge signal on electric wave of the LF band. Since the interception of the signal is hardly performed by a suspicious person by varying the frequency band used for the transmission of the Wake signal and the Challenge signal, it may be more preferable that the Challenge signal is transmitted on the electric waves of the UHF band.

In this case, the BCM 10 transmits the Wake signal and the Challenge signal from the identical LF antenna 31. In addition, the electronic key 20 receives the Wake signal and the Challenge signal with the identical LF antenna 21.

In, the present embodiment, the transmission frequency and the reception frequency are switched in the BCM 10 and the electronic key 20 according to the frequency hopping pattern that is specified based on the Challenge signal, when the Burst signal is transmitted from the electronic key 20 to the BCM 10. However, it is not necessarily limited this. For example, it may be configured such that the Burst signal of which transmission frequency has been switched according to the frequency hopping pattern is not transmitted. In this case, the configuration of the frequency hopping pattern may be omitted.

The vehicle system of the present disclosure includes an onboard apparatus mounted to a vehicle, and a portable device carried by a user. The vehicle system controls the vehicle according to a result of verification using wireless communication in which signals are transmitted and received on electric waves, between the onboard apparatus and the portable device. The onboard apparatus includes vehicle-side transmission processor that transmits a second signal so as to have a signal intensity according to signal intensity information, following transmission of a first signal from which the signal intensity information can be specified, the signal intensity information being information on the signal intensity of the second signal that is transmitted after the transmission of the first signal, from vehicle-side transmission antennas arranged in the vehicle. The portable device includes portable device-side reception antennas that receive signals transmitted from the vehicle-side transmission antennas, a signal intensity measurement portion that measures a signal intensity of a signal that is received by the portable device-side reception antennas after the first signal, and a reply determiner that determines whether or not to perform a reply to the onboard apparatus for verification, based on the signal intensity information on a signal intensity of the second signal, the signal intensity of the second signal being specified from the first signal that is received by the portable device-side reception antennas, and a signal intensity that is actually measured by the signal intensity measurement portion.

It is difficult to adjust the signal intensity in the portable device when receiving signal by the portable device through a relay that is used in a relay attack to the signal intensity in the portable device when directly receiving signal by wireless communication from the onboard apparatus to the portable device.

According to the vehicle system according to an aspect of the present disclosure, the first signal transmitted from the onboard apparatus to the portable device prior to the transmission of the second signal is a signal from which the signal intensity information on the signal intensity of the second signal can be specified. It determined whether or not to perform a reply to the onboard apparatus for verification, based on the signal intensity information on the signal intensity of the second signal that can be specified from the first signal received from the portable device-side reception antenna and the signal intensity that is actually measured by the signal intensity measurement portion.

During a relay attack, the reply determiner determines not to perform a reply from the portable device, depending on whether the signal intensity determined from the actually measured signal intensity or a value obtained from the signal intensity matches a value for the signal intensity of a second signal obtained from the specified signal intensity information. Therefore, it may be possible to prevent the relay attack.

Further, since the vehicle system according to an aspect of the present disclosure does not require intensity ratios of respective signals transmitted from different vehicle-side transmission antennas, even when multiple vehicle-side transmission antennas are provided in different positions of the vehicle, it is not necessary to make most of the transmission ranges of the respective vehicle-side transmission antennas overlap each other. Therefore, it is neither necessary to make the arrangement different from the arrangement of the vehicle-side transmission antennas of a typical smart system, nor necessary to significantly increase the antenna outputs of the vehicle-side transmission antennas.

Thus, it may be possible to prevent damage by the relay attack while suppressing an arrangement change and power consumption of the vehicle-side transmission antennas as less as possible.

Since the onboard apparatus and the portable device according to the present disclosure are used in the vehicle system, it may be possible to prevent damage caused by the relay attack even while suppressing an arrangement change and power consumption of the vehicle-side transmission antennas.

In the process described in this application, there are multiple timings, and each timing is represented, for example, as t1. In addition, each timing may be divided into multiple sub-timing, and one timing may be formed by combining multiple timings.

In addition, in the present embodiment, "portion" is obtained by classifying conveniently the inner parts of the vehicle-side controller 14 and the key-side controller 26 focusing on the functions thereof, it does not mean that the inner parts of the vehicle-side controller 14 and the key-side controller 26 are physically divided into portions corresponding to respective "portion". Thus, each "portion" may be software-implemented as software, as a part of a computer program, or may also be hardware-implemented by an IC chip or a large-scale integrated circuit.

It should be noticed that the present disclosure is not intended to be limited to the embodiments described above, but may be altered within the scope of the present disclosure, and embodiments obtained by appropriately combining the technical means respectively disclosed in different embodiments are also included in the technical scope of the present disclosure.

While the embodiments, the configurations, and the modes according to the present disclosure have been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle system comprising:
an onboard apparatus that is mounted to a vehicle; and
a portable device that is carried by a user,
wherein:
the vehicle system controls the vehicle according to a result of collation using wireless communication in which a signal is transmitted and received on electric wave, between the onboard apparatus and the portable device;
the onboard apparatus includes
a vehicle-side transmission processor that transmits a first signal and a second signal from a vehicle-side transmission antenna placed to the vehicle, wherein the first signal includes a sequence of a first predetermined region specifying signal intensity information on a signal intensity of the second signal, the second signal is transmitted following the first signal and has the signal intensity according to the signal intensity information defined in the first signal; and
the portable device includes
a portable device-side reception antenna that receives a signal transmitted from the vehicle-side transmission antenna, and
a portable device-side controller configured to perform a signal intensity measurement portion and a reply determiner;
the signal intensity measurement portion is configured to measure a signal intensity of the signal received by the portable device-side reception antenna received following the first signal; and
the reply determiner is configured to determine whether a reply is performed to the onboard apparatus for the collation, based on both of
(i) the signal intensity information on the signal intensity of the second signal, the signal intensity of the second signal being specified from the first signal received by the portable device-side reception antenna, and
(ii) the signal intensity that is actually measured by the signal intensity measurement portion.

2. The vehicle system according to claim 1, wherein:
the vehicle-side transmission processor transmits from the vehicle-side transmission antenna, second signals a plurality of times having the signal intensity according to the signal intensity information, following transmission of the first signal from which the signal intensity information is specified, the signal intensity information being information on the signal intensity of the second signals transmitted the plurality of times after the transmission of the first signal;
the signal intensity information includes information on a relative intensity which is at least one of a difference of signal intensities of the second signals transmitted the plurality of times and a ratio of the signal intensities of the second signals transmitted the plurality of times;
the portable device includes
a relative intensity specification portion configured to specify the relative intensity between the second signals transmitted the plurality of times after the transmission of the first signal, from the first signal received by the portable device-side reception antenna,
a relative intensity calculator calculates the relative intensity between signals transmitted the plurality of times, from a measurement result of signal intensities of the signals transmitted a plurality of times that are measured by the signal intensity measurement portion, and
a match determiner configured to determine whether the relative intensity, specified by the relative intensity specification portion, between the second signals transmitted the plurality of times and the relative intensity calculated by the relative intensity calculator match each other;

the reply determiner is configured to determine to perform a reply to the onboard apparatus for the collation, when it is determined that the relative intensities match each other by the match determiner; and the reply determiner is configured to determine not to perform the reply to the onboard apparatus for the collation, when it is determined that the relative intensities do not match each other.

3. The vehicle system according to claim 2, wherein:
the first signal is a signal of a code for the collation;
the portable device includes
a portable device-side encryption processor that encrypts the code of the first signal using a secret key; and
the relative intensity specification portion is configured to specify the relative intensity from a sequence of a first predetermined region of a code obtained by encrypting the code of the first signal with the portable device-side encryption processor.

4. The vehicle system according to claim 1, wherein:
the vehicle-side transmission processor transmits the first signal that specifies frequency hopping pattern information which is a switching pattern of a transmission frequency of a third signal that is transmitted a plurality of times in a frequency hopping scheme from the portable device, from the vehicle-side transmission antenna;
the portable device includes
a portable device-side transmission processor that switches the transmission frequency according to the frequency hopping pattern information specified from the first signal received by the portable device-side reception antenna and transmits the third signal from a portable device-side transmission antenna of the portable device, when the reply determiner determines to perform the reply to the onboard apparatus for the collation; and
the onboard apparatus includes
a vehicle-side receptor configured to receive a signal through a vehicle-side reception antenna placed to the vehicle, and
a frequency switch that performs switching of a reception frequency in the vehicle-side receptor according to the frequency hopping pattern information specified from the first signal transmitted by the vehicle-side transmission processors.

5. The vehicle system according to claim 4, wherein:
the first signal is a signal of a code for the collation;
the portable device includes
a portable device-side encryption processor that encrypts the code of the first signal, using a secret key common to the onboard apparatus and the portable device, and
a portable device-side pattern specification portion configured to specify the frequency hopping pattern information from a sequence of a second predetermined region of a code obtained by encrypting the code of the first signal with the portable device-side encryption processor;
the portable device-side transmission processor performs switching of the transmission frequency according to the frequency hopping pattern information specified by the portable device-side pattern specification portion,
and transmits the third signal from the portable device-side transmission antenna of the portable device;
the onboard apparatus includes
a vehicle-side encryption processor that encrypts the code of the first signal, using the secret key common to the onboard apparatus and the portable device, and
a vehicle-side pattern specification portion configured to specify the frequency hopping pattern information, from a sequence of the second predetermined region of a code obtained by encrypting the code of the first signal with the vehicle-side encryption processor; and
the frequency switch switches a reception frequency in the vehicle-side receptor according to the frequency hopping pattern information specified by the vehicle-side pattern specification portion.

6. An onboard apparatus used in the vehicle system according to claim 1.

7. A portable device used in the vehicle system according to claim 1.

8. A vehicle system comprising:
an onboard apparatus that is mounted to a vehicle; and
a portable device that is carried by a user,
wherein:
the vehicle system controls the vehicle according to a result of collation using wireless communication in which a signal is transmitted and received on electric wave, between the onboard apparatus and the portable device;
the onboard apparatus includes a vehicle-side transmission processor that transmits a first signal that specifies signal intensity information and, following transmission of the first signal, transmits a second signal having a signal intensity according to the signal intensity information, from a vehicle-side transmission antenna placed to the vehicle, the signal intensity information being information on the signal intensity of the second signal that is transmitted after the transmission of the first signal;
the portable device includes
a portable device-side reception antenna that receives a signal transmitted from the vehicle-side transmission antenna, and
a portable device-side controller configured to perform a signal intensity measurement portion and a reply determiner;
the signal intensity measurement portion is configured to measure a signal intensity of the signal received by the portable device-side reception antenna after the first signal; and
the reply determiner is configured to determine whether a reply is performed to the onboard apparatus for the collation, based on
(i) the signal intensity information on the signal intensity of the second signal, the signal intensity of the second signal being specified from the first signal received by the portable device-side reception antenna, and
(ii) the signal intensity that is actually measured by the signal intensity measurement portion.

9. The vehicle system according to claim 8, wherein:
the vehicle-side transmission processor transmits from the vehicle-side transmission antenna, second signals a plurality of times having the signal intensity according to the signal intensity information, following transmission of the first signal from which the signal intensity information is specified, the signal intensity information being information on the signal intensity of the second signals transmitted the plurality of times after the transmission of the first signal; and the signal intensity information includes information on a relative intensity which is at least one of a difference of signal intensities of the second signals transmitted the plurality of times and a ratio of the signal intensities of the second signals transmitted the plurality of times.

10. The vehicle system according to claim 9, wherein:

the portable device includes
- a relative intensity specification portion configured to specify the relative intensity between the second signals transmitted the plurality of times after the transmission of the first signal, from the first signal received by the portable device-side reception antenna,
- a relative intensity calculator calculates the relative intensity between signals transmitted the plurality of times, from a measurement result of signal intensities of the signals transmitted a plurality of times that are measured by the signal intensity measurement portion, and
- a match determiner configured to determine whether the relative intensity, specified by the relative intensity specification portion, between the second signals transmitted the plurality of times and the relative intensity calculated by the relative intensity calculator match each other;

the reply determiner is configured to determine to perform a reply to the onboard apparatus for the collation, when it is determined that the relative intensities match each other by the match determiner; and the reply determiner is configured to determine not to perform the reply to the onboard apparatus for the collation, when it is determined that the relative intensities do not match each other.

* * * * *